United States Patent
Jawaharlal et al.

(10) Patent No.: US 10,191,764 B2
(45) Date of Patent: Jan. 29, 2019

(54) AGENT-BASED END-TO-END TRANSACTION ANALYSIS

(71) Applicant: International Business Machines Corporation, Armonk, NY (US)

(72) Inventors: Samuel M. Jawaharlal, Chennai (IN); Arunachalam Narayanan, Chennai (IN); Sathya Santhar, Chennai (IN); Santosh Shanmukh, Bangalore (IN); Balamurugaramanathan Sivaramalingam, Paramakudi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/630,408

(22) Filed: Jun. 22, 2017

(65) Prior Publication Data

US 2018/0373559 A1    Dec. 27, 2018

(51) Int. Cl.
| | |
|---|---|
| G06F 9/445 | (2018.01) |
| G06F 9/46 | (2006.01) |
| H04L 12/24 | (2006.01) |
| G06Q 20/10 | (2012.01) |
| G06Q 10/06 | (2012.01) |
| G06F 11/34 | (2006.01) |

(52) U.S. Cl.
CPC .......... *G06F 9/466* (2013.01); *G06F 11/3409* (2013.01); *G06F 11/3495* (2013.01); *G06Q 10/063* (2013.01); *G06Q 20/10* (2013.01); *H04L 41/046* (2013.01)

(58) Field of Classification Search
USPC .................................. 717/130, 141
See application file for complete search history.

(56) References Cited

U.S. PATENT DOCUMENTS

| | | | |
|---|---|---|---|
| 4,654,862 | A | 3/1987 | Bentley et al. |
| 5,655,081 | A | 8/1997 | Bonnell et al. |
| 5,922,079 | A | 7/1999 | Booth et al. |
| 6,460,070 | B1 | 10/2002 | Turek et al. |

(Continued)

OTHER PUBLICATIONS

Emily Hill et al., "Automatically Capturing SourceCodeContext of NL-Queries for SoftwareMaintenance and Reuse", 31st International Conference on Software Engineering, Vancouver, Canada, May 16-24, 2009, all pages.

(Continued)

*Primary Examiner* — Chuck O Kendall
(74) *Attorney, Agent, or Firm* — Law Offices of Ira D. Blecker, P.C.

(57) ABSTRACT

A method for agent-based transaction analysis which includes: building an instrumented binary code of a software application for a transaction; configuring an analysis agent for the software application; starting the software application in an application process environment with the instrumented binary code; attaching the analysis agent to the instrumented binary code of the software application; extracting by the analysis agent the metadata from the software application; sending the metadata to a central analysis server in an environment separate from the application process environment; and building by the central analysis server an end-to-end description of the transaction from the metadata.

20 Claims, 4 Drawing Sheets

(56) References Cited

U.S. PATENT DOCUMENTS

| | | |
|---|---|---|
| 6,742,141 B1 | 5/2004 | Miller |
| 6,865,696 B2 | 3/2005 | Lopke |
| 7,080,287 B2 | 7/2006 | Salem |
| 7,516,362 B2 | 4/2009 | Connelly et al. |
| 7,689,688 B2 | 3/2010 | Iwamoto |
| 8,935,676 B2 | 1/2015 | Verbest |
| 9,311,598 B1 | 4/2016 | Bansal et al. |
| 2004/0128583 A1 | 7/2004 | Iulo et al. |
| 2006/0120181 A1 | 6/2006 | Berbaum et al. |
| 2015/0106659 A1 | 4/2015 | Kapur et al. |
| 2015/0302198 A1* | 10/2015 | Payne .................. G06F 21/562 726/23 |

OTHER PUBLICATIONS

Anandi Krishnamurthy, "Develop Better Software Faster with IBM Rational Systems Developer and IBM Rational PurifyPlus", Apr. 15, 2007, all pages.

* cited by examiner

AGENT-BASED END-TO-END TRANSACTION ANALYSIS

BACKGROUND

The present exemplary embodiments pertain to a comprehensive end-to-end analysis of transactions, such as business transactions, that may run across multiple software applications.

Business transactions may be complex. Some business transactions may involve multiple software applications. Other business transactions may involve multiple software applications on multiple platforms in different application environments.

Such business transaction complexity may make it difficult to analyze, understand, troubleshoot and test complex enterprise projects.

BRIEF SUMMARY

The various advantages and purposes of the exemplary embodiments as described above and hereafter are achieved by providing, according to an aspect of the exemplary embodiments, a computer-implemented method for agent-based transaction analysis comprising: building an instrumented binary code of a software application for a transaction; configuring an analysis agent for the software application; starting the software application in an application process environment with the instrumented binary code; attaching the analysis agent to the instrumented binary code of the software application; extracting by the analysis agent the metadata from the software application; sending the metadata to a central analysis server in an environment separate from the application process environment; and building by the central analysis server an end-to-end description of the transaction from the metadata.

According to another aspect of the exemplary embodiments, there is provided a computer-implemented method for agent-based transaction analysis comprising: building an instrumented binary code for each of a plurality of software applications for a transaction; configuring an analysis agent for each of the software applications; starting a first software application of the software applications in a first application process environment with the instrumented binary code for the first software application; starting a second software application of the software applications in a second application process environment with the instrumented binary code for the second software application, the first application process environment being separate from the second application process environment; attaching a first analysis agent to the instrumented binary code of the first software application; attaching a second analysis agent to the instrumented binary code of the second software application; extracting by the first analysis agent the metadata from the first software application; extracting by the second analysis agent the metadata from the second software application; sending the metadata from the first software application and the second software application to a central analysis server in an environment separate from the first and second application process environments; and building by the central analysis server an end-to-end description of the transaction from the metadata from the first software application and the second software application.

According to a further aspect of the exemplary embodiments, there is provided a computer program product for agent-based transaction analysis, the computer program product comprising a computer readable storage medium having program instructions embodied therewith, the program instructions executable by a processor to cause the processor to perform a method comprising: building an instrumented binary code of a software application for a transaction; configuring an analysis agent for the software application; starting the software application in an application process environment with the instrumented binary code; attaching the analysis agent to the instrumented binary code of the software application; extracting by the analysis agent the metadata from the software application; sending the metadata to a central analysis server in an environment separate from the application process environment; and building by the central analysis server an end-to-end description of the transaction from the metadata.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
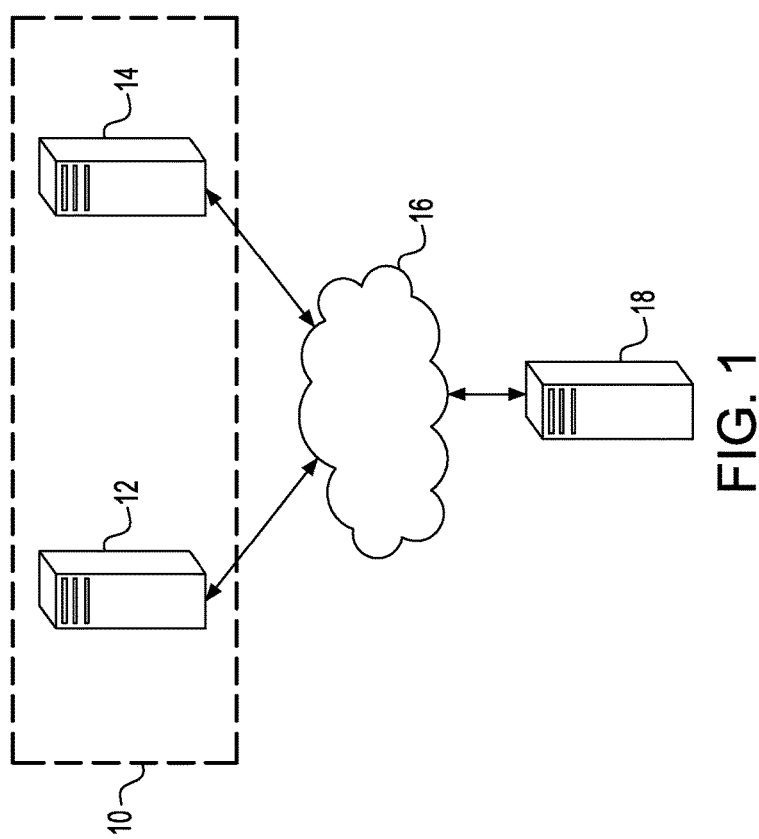
FIG. 1 is an overview of the exemplary embodiments.

The exemplary embodiments describe a system and method by which the end to end flow of execution and control, along with the corresponding data transacted and processed amongst the interacting processes of a set of software applications may be traced, both within and across the application and host boundaries. The exemplary embodiments inject an introspection library into the running processes to extract process execution metadata from multiple processes in motion.

The focus of the exemplary embodiments is not only on data flow but also on control flow where there may not be data. For example, one application might be involved in getting the trigger from other applications and sending events to customers where there is no data involved from other applications. There may be multiple instances of the application running and it may receive hundreds of triggers in a second from hundreds of applications. Correlating the control flow across the applications and segregating them from other flows may be done with the exemplary embodiments which is dependent on the process execution metadata extracted from different applications rather than correlating the logs of multiple applications which may be error prone.

Presently available tools do not address the need of being able to perform comprehensive end to end analysis at the abstraction of transactions that may run across multiple software applications.

Being able to build an end to end representation, both as diagrams as well as correlated data, of end to end transactions across a of set of interacting software applications will be invaluable in multiple dimensions:

The application of the exemplary embodiments to end to end testing of complex enterprise projects may reduce the time to isolate issues and fix them.

In a context where legacy applications are inherited for maintenance/enhancement work by one or more vendors, the stakeholders may develop a much deeper insight into the workings of the applications in the application environments by executing end to end test cases and learning from the aggregated and enriched metadata collected than just using static reverse engineering/modeling tools.

The exemplary embodiments may include build/setup time components and run time components.

The build/setup runtime components may include a code introspection/analysis library (AL) which may be implemented in the programming language corresponding to that of the application and platform. The AL is a library that may be compiled along with the application code. This step performs object code insertion thus instrumenting the application code. For example, Java (jar) on Windows or C++ (shared library) on Solaris. Knowledge of the specific application code is not necessary to the exemplary embodiments. Nor is the source code changed by the exemplary embodiments.

The AL is implemented per platform and technology as part of the exemplary embodiments. When the AL is compiled with the application code, the AL gets loaded into memory as part of the executing process. Thus during runtime, the AL gets access to the instruction set being executed by the CPU. As instructions come out of the processor, the AL will intercept the instructions and extract the process execution metadata.

The build/setup runtime components may be responsible for providing the interface and mechanism to the application process in order to extract the process execution metadata during execution. Some examples of the process execution metadata may include, but not be limited to, source code statement, data in memory stored by any given variable/object, data transmitted as part of the transaction, memory addresses being used, timestamps etc., and higher level technology implementation details within and across application boundaries such as usage of RPC (Remote Procedure Call), CORBA (Common Object Request Broker Architecture), SOAP Web Services (Simple Object Access Protocol) and REST (Representational State Transfer).

The run time components may include one or more Analysis Agents (AA), a Central Analysis Admin (CAA) application and one or more of Analysis Consumers/Clients (AC).

The Analysis Agent is a software agent along with its configuration file that may be deployed one per software application environment. The Analysis Agent's responsibility is to:
 Bind/attach to the application process and extract the process execution metadata described above during the execution of the application process using the injected AL interface. The AA attaches to the running processes by utilizing the relevant API (application programming interface) provided by the operating system. One example is ptrace( ) in linux. The AA may be implemented by tracing the instructions/code (statements and variables) as well as the process execution metadata;
 Send the process execution metadata collected to the CAA application;
 Receive information/"knowledge" about other AAs in the network from the CAA; and
 Exchange process execution metadata with the other AAs in the network.

The Central Analysis Admin application is a central administration application that will be responsible for:
 The management of the AAs including, but not limited to, registering, starting up, shutting down and monitoring of the AAs;
 The synchronization of identity information amongst the AAs managed will make every AA on the network aware of every other AA on the network, indicate which servers the AAs are deployed in and what processes the AAs are monitoring. This identity information may include process ids (identifications), IP (internet protocol) address, port number of the process being monitored, time stamps and time zone/locale information of the transaction to be invoked;
 The collection and storage of process execution metadata sent by the AAs using a persistent data store;
 The correlation, enrichment and visualization of the process execution metadata collected from across all of the managed AAs; and
 The management of authorized analysis consumers to access and work with the process execution metadata. That is, only registered users will be allowed to access the process execution metadata.

The Analysis Consumer/Client is a component, an IDE (Integrated Development Environment) like thick client, or web based interface (accessed via a browser) which will allow an authorized user, typically a business analyst, tester or developer, to perform the following activities:
 Register/Subscribe to the process execution metadata from one or more application environments being monitored, or all of them;
 View the correlated and enriched process execution metadata and interact with it such as playback/simulate or drill down reports; and
 Annotate the process execution metadata with additional notes, and socialize the same with the team via email notifications/subscriptions.

Referring to the Figures in more detail, and particularly referring to FIG. 1, there is illustrated an overview of the exemplary embodiments. A business transaction, indicated by dashed lines 10, may require multiple application process environments 12, 14. The application process environments 12, 14 may be a distributed computing environment in which application process environments 12, 14 may be physical computing devices in disparate locations. Application process environments 12, 14 may communicate through a network 16 which may be, for example, the Internet, a local area network (LAN) or a wide area network (WAN).

It is also within the scope of the exemplary embodiments for the application process environments 12, 14 to be virtual machines located on the same computing device but being run independently such that the virtual machines hosting the application process environments 12, 14 may have different operating systems.

Further shown in FIG. 1 is a central analysis server 18 which may host the CAA application. Preferably, the CAA application on central analysis server 18 is in an environment distinct from the application process environments 12, 14. The environment of the central analysis server may be on a separate physical computing device than the application process environments 12, 14 or be on the same physical computing device but on a different virtual machine which may also include a different operating system. The central analysis server 18 may interact with the application process environments 12, 14 through network 16 which again may be, for example, the Internet, a local area network (LAN) or a wide area network (WAN).

For the purpose of illustration and not limitation, the computing devices mentioned above for the application process environments 12, 14 and the central analysis server 18 may be, for example, Unix servers or Windows servers. If the application process environments 12, 14 and the central analysis server 18 are virtual machines, they may be hosted by the Unix servers or Windows servers.

Figure 2:
FIG. 2 is an illustration of combining source code of an application with an analysis library to result in an instrumented binary.

Referring now to FIG. 2, there is an illustration of the formation of an instrumented binary 20. An instrumented binary 20 is built from the source code 22 in debug mode along with the AL 24 to inject the additional code information and the necessary hooks to gather the process execution metadata from a business transaction. The instrumented binary 20 is modified object code due to the insertion of the AL 24 into the source code 22 during the debugging operation. No changes to the source code 22 are necessary.

Figure 3:
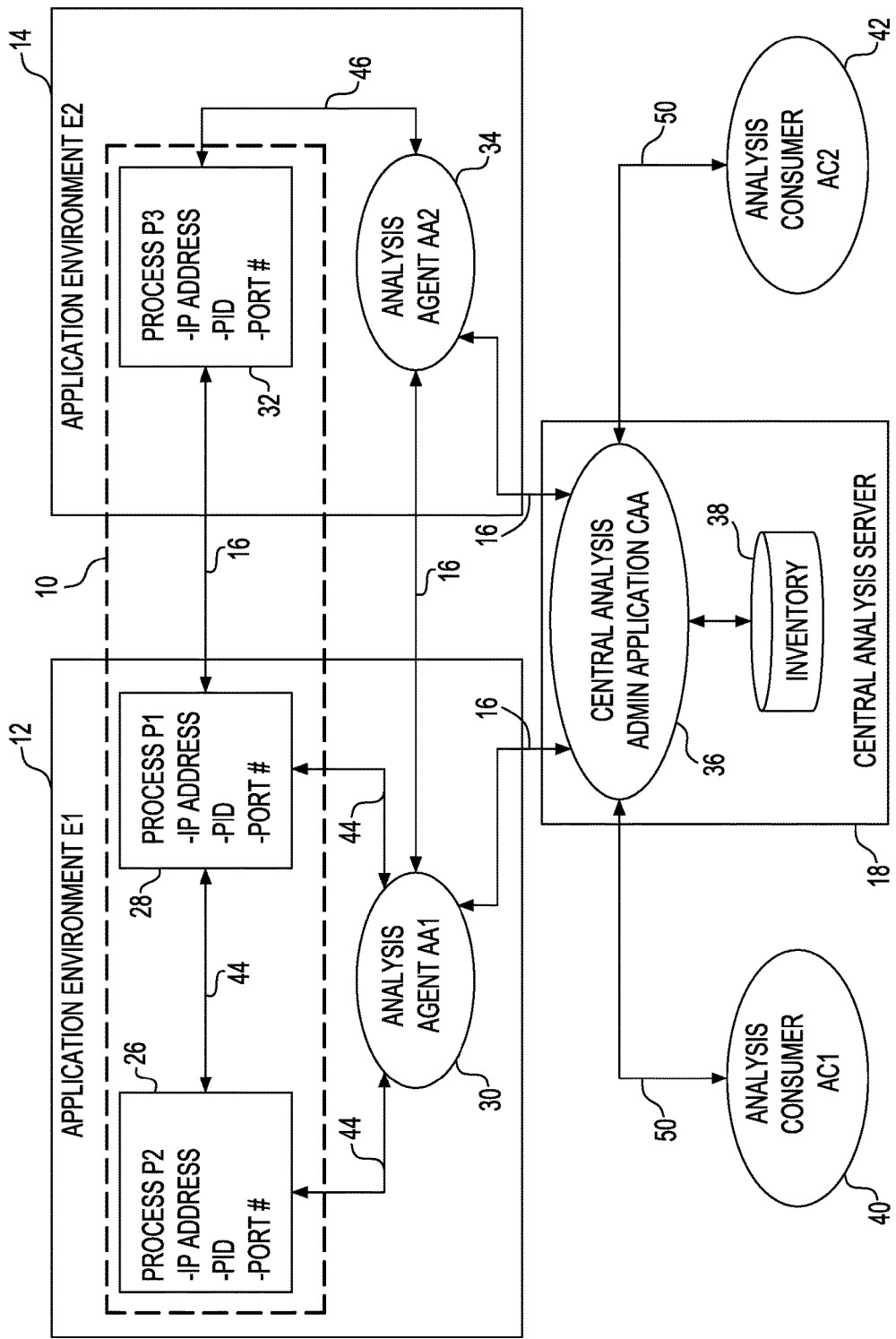
FIG. 3 is a view of FIG. 1 illustrating analysis agents that work with processes to provide process execution metadata to a central analysis admin application.

The exemplary embodiments are illustrated in more detail in FIG. 3. Process P1 28 and Process P2 26 are hosted in Application Environment E1 12. Process P1 28 and Process P2 26 may be identified by information such as IP (internet protocol) address, Process ID and Port number. Application Environment E1 12 may further include Analysis Agent AA1 30.

Process P3 32 is hosted in Application Environment E2 14. Process P3 32 may be identified by information such as IP address, Process ID and Port number. Application Environment E2 14 may further include Analysis Agent AA2 34.

An Analysis Agent may be deployed in every application environment that is being analyzed. As illustrated in FIG. 3, Analysis Agent AA1 30 is deployed in Application Environment E1 12 while Analysis Agent AA2 34 is deployed in Application Environment E2 14.

Process P1 28, Process P2 26 and Process P3 32 comprise a transaction 10, such as a business transaction. The exemplary embodiments may have application to any transactional environment where it is desirable to understand the data flow and control flow of the transaction 10. The transaction 10 may extend over different application environments, such as Application Environment E1 12 and Application Environment E2 14, each of which may be on different computing platforms.

Further shown in FIG. 3 is the Central Analysis Server 18 which may host the Central Analysis Application CAA 36. Also within the Central Analysis Server 18, or possibly remotely connected to the Central Analysis Server 18, may be a persistent storage, denoted in FIG. 3 as Inventory 38.

The exemplary embodiments may further include Analysis Consumer AC1 40 and Analysis Consumer AC2 42.

As Process P1 28, Process P2 26 and Analysis Agent AA1 30 are hosted in the same Application Process Environment E1 12, communication between the Process P1 28, Process P2 26 and Analysis Agent AA1 30 may be easily facilitated by a communication means, such as a communication bus represented by arrows 44, within the Application Environment E1 12. Similarly, as Process P3 32 and Analysis Agent AA2 34 are hosted in the same Application Process Environment E2 14 communication between the Process P3 32 and Analysis Agent AA2 34 may be easily facilitated by a communication means, such as a communication bus represented by arrows 46, within the Application Environment E2 14.

Any communication between the components in Application Environment E1 12, Application Environment E2 14 and the Central Analysis Server 18 may be by the network connection as discussed previously and represented in FIG. 3 by arrows 16.

As Analysis Consumer AC1 40 and Analysis Consumer AC2 42 may be remotely located from the Central Analysis Server 18, communication between Analysis Consumer AC1 40 and Analysis Consumer AC2 42 and the Central Analysis Server 18 may be by a network connection as discussed previously and represented in FIG. 3 by arrows 50.

The CAA 36 shall be configured to register the Analysis Agent AA1 30 and the Analysis Agent AA2 34 on the network 48. Any other AAs would be similarly registered. Registration may be by defining the IP address, port and name of the application that the AA is monitoring.

Process P1 28, Process P2 26 and Process P3 32 are started up as per the application defined M&Ps. M&Ps are Methods & Procedures typically documented in the application's operations manual/help document.

The Analysis Agent AA1 30 and Analysis Agent AA2 34 may be configured with the information on the process IDs and instrumented binaries to be bound to. The Analysis Agent on any server may be configured with the process name, IP address and the port number of the process that the Analysis Agent needs to monitor. The process would start up first and then the Analysis Agent would attach to the process at the identified port once the Analysis Agent is started up. The Analysis Agent AA1 30 and Analysis Agent AA2 34 may then be started up.

The Analysis Agent AA1 30 and Analysis Agent AA2 34 bind/attach to the processes being monitored. In the illustration in FIG. 3, Analysis Agent AA1 30 is bound to Process P1 28 and Process P2 26 while Analysis Agent AA2 34 is bound to Process P3 32.

The Analysis Agent AA1 30 and Analysis Agent AA2 34 may go through a handshake process with the CAA 36 so as to establish a connection between the CAA 36 and Analysis Agent AA1 30 and Analysis Agent AA2 34.

The CAA 36 may broadcast information about every AA to every other AA so that the AAs may exchange process execution metadata. In the illustration of FIG. 3, the CAA 36 will broadcast information about Analysis Agent AA1 30 and Analysis Agent AA2 34. Such broadcasting will enable Analysis Agent AA1 30 and Analysis Agent AA2 34 to share information about their respective processes and their characteristics, such as process name, process id, port, IP address to the peer agents. The benefit is that, as transactions cross the boundary between Application Environment E1 12 and Application Environment E2 14, Analysis Agent AA1 30 and Analysis Agent AA2 34 agents bound to the sending and receiving processes can send this additional process execution metadata to the CAA 36, thereby making it easier for correlation of the process execution metadata from Analysis Agent AA1 30 and Analysis Agent AA2 34 allowing the CAA 36 to build a cohesive picture of the end to end transaction 10.

As test cases may be executed by the user, and the execution of code occurs, Analysis Agent AA1 30 and Analysis Agent AA2 34 may continuously extract the process execution metadata and transmit the process execution metadata to the CAA 36.

The CAA 36 may persist the "raw" process execution metadata received from Analysis Agent AA1 30 and Analysis Agent AA2 34 into Inventory 38, along with the knowledge about which of Analysis Agent AA1 30 and Analysis Agent AA2 34 the CAA 36 received the process execution metadata from, when (timestamp) etc.

The CAA 36 may process the raw process execution metadata persisted and correlate the process execution metadata received from across the different AAs, such as Analysis Agent AA1 30 and Analysis Agent AA2 34, and build a cohesive picture of the end to end transaction 10 as the transaction crosses over from one process to another within and across application environments via transactions or other means like files etc. The CAA 36 has a data store associated with it which could be either relational or NoSQL type of store, which may store all the static analysis and process execution metadata data. The CAA 36 may then construct two types of models. One type of model may be a static model such as a UML Sequence diagram/call graph. Another type of model may be a dynamic representation of the execution such as might occur with an interactive debugger. An interactive debugger is a program that lets you control other programs, and inspect their state. You can set it to pause the controlled program at certain points (e.g., when execution enters a specific function, or reaches a specific line of code). You can look at the values of variables during execution and, in some cases, modify them.

The CAA 36 may enrich the as-is process execution metadata with additional useful data like middleware technologies used—JAX-WS, JAX-RS, CORBA etc., knowledge of database calls made, read/write to sockets, files, queues etc.

The Analysis Consumer AC1 40 and Analysis Consumer AC2 42 may login to the CAA 36 via a thick client or web based application and interact with the correlated and enriched data.

Figure 5:
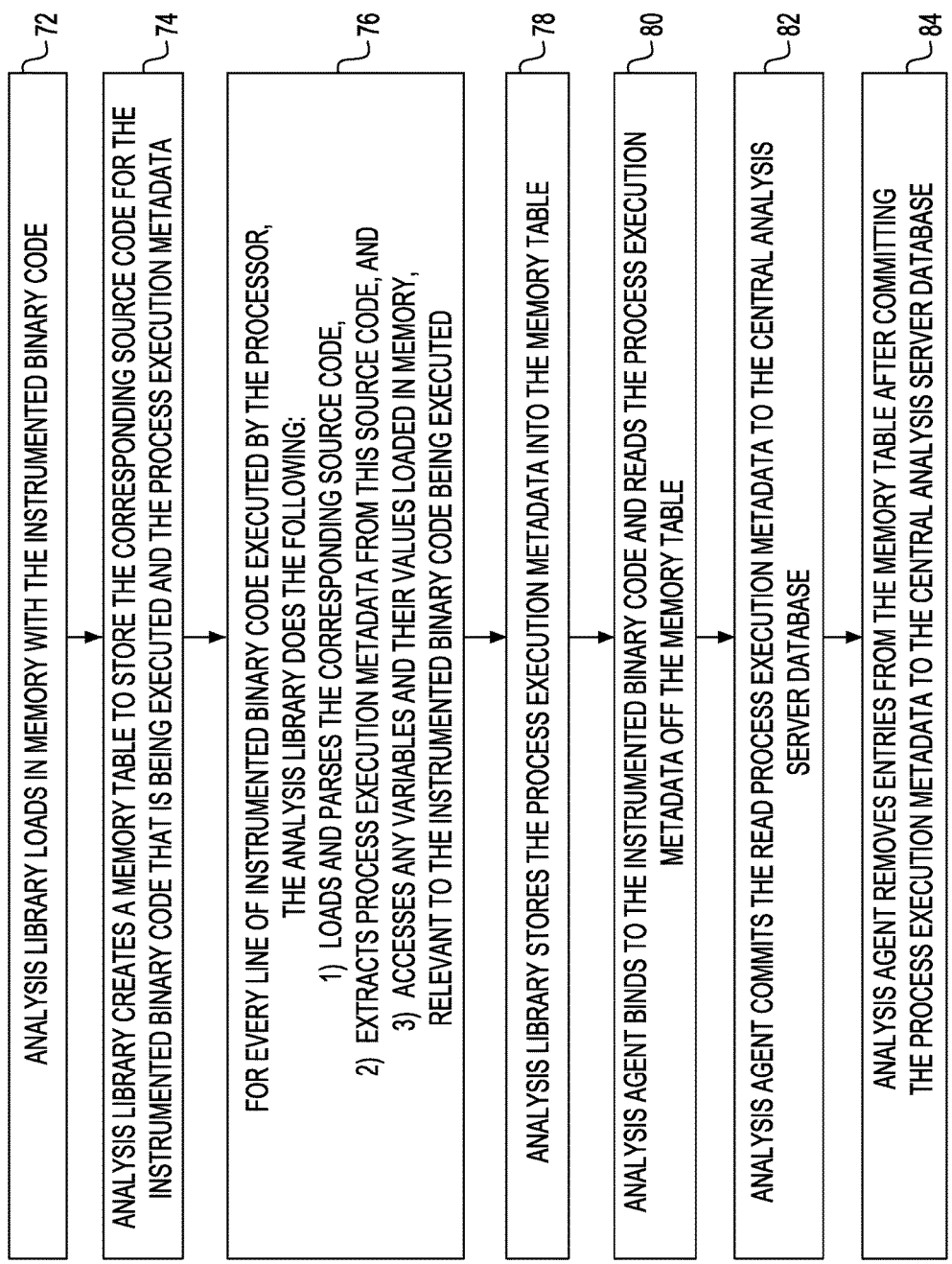
FIG. 5 is an algorithm illustrating the cooperation between the analysis library and the analysis agent.

Referring now to FIG. 5, there is depicted an algorithm for the cooperation of the AL and AA. Initially, the AL loads in memory with the instrumented binary code, box 72.

The AL creates a memory table to store the corresponding source code for the instrumented binary code that is being executed and the extracted process execution metadata, box 74.

For every line of instrumented binary code executed by the processor, the AL loads and parses the corresponding source code, extracts process execution metadata from this source code and accesses any variables and their values loaded in memory, relevant to the instrumented binary code being executed, box 76.

The AL stores the source code and its corresponding process execution metadata into the memory table, box 78.

The AA binds to the running process using an API provided by the operating system and reads the process execution metadata off the memory table, box 80.

The AA commits the process execution metadata that is read to the central analysis server database (i.e., inventory 38), box 82.

The AA removes the entries from the memory table after committing the process execution metadata to the central analysis server database, box 84.

The exemplary embodiments may perform end-to-end analysis of code and data flow across boundaries of multiple applications on diverse platforms. The exemplary embodiments further use the notion of data mining and aggregation to facilitate analysis and construction of a cohesive picture of end to end transactions across the participating applications. And, the exemplary embodiments may capture higher level technology concepts and abstractions from the code in addition to the low level data.

Figure 4:
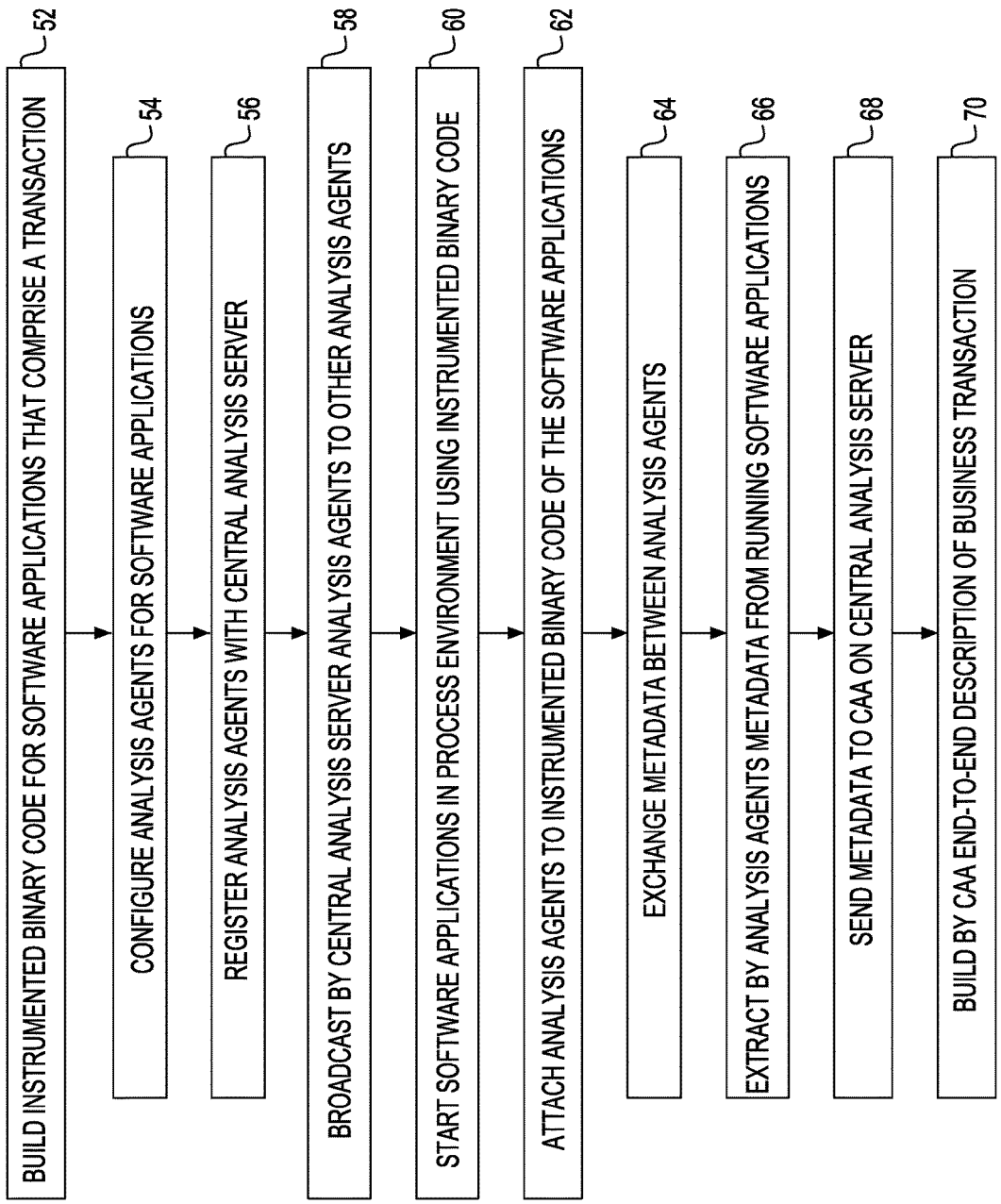
FIG. 4 is a flow chart illustrating a method of the exemplary embodiments.

Referring now to FIG. 4, a flowchart of a method of the exemplary embodiments is illustrated.

Instrumented binary code is built for the software applications in the application environments, box 52. This is for all of the software applications that make up a transaction.

The analysis agents are configured for the software applications, box 54.

The analysis agents may be registered with the central analysis server, box 56. The central analysis server may then broadcast the identity of the analysis agents to other analysis agents, box 58.

The software applications are started in their application environments using the instrumented binary code for each software application, box 60.

The analysis agents are attached to the instrumented binary code of the analysis agents' respective software applications, box 62.

Process metadata may be exchanged between the various analysis agents 64.

The analysis agents extract process execution metadata from the running software applications, box 66.

The extracted process execution metadata is sent to the CAA that is hosted on the central analysis server, box 68.

The CAA builds an end-to-end description of the transaction, box 70.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A computer-implemented method for agent-based transaction analysis comprising:
    building an instrumented binary code of a software application for a transaction;
    configuring an analysis agent for the software application;
    starting the software application in an application process environment with the instrumented binary code;
    attaching the analysis agent to the instrumented binary code of the software application;
    extracting by the analysis agent the metadata from the software application wherein the metadata includes data transmitted as a part of the transaction;
    sending the metadata to a central analysis server in an environment separate from the application process environment; and
    building by the central analysis server an end-to-end description of the transaction from the metadata.

2. The method of claim 1 wherein the end-to-end description of the transaction includes data flow and control flow of the business transaction.

3. The method of claim 1 further comprising registering the analysis agent with the central analysis server.

4. The method of claim 1 wherein the analysis agent handshakes with the central analysis server.

5. The method of claim 1 further comprising storing the metadata.

6. The method of claim 1 further comprising an analysis consumer to view the metadata and the end-to-end description of the transaction.

7. A computer-implemented method for agent-based transaction analysis comprising:
    building an instrumented binary code for each of a plurality of software applications for a transaction;
    configuring an analysis agent for each of the software applications;
    starting a first software application of the software applications in a first application process environment with the instrumented binary code for the first software application;
    starting a second software application of the software applications in a second application process environment with the instrumented binary code for the second software application, the first application process environment being separate from the second application process environment;

attaching a first analysis agent to the instrumented binary code of the first software application;

attaching a second analysis agent to the instrumented binary code of the second software application;

extracting by the first analysis agent the metadata from the first software application;

extracting by the second analysis agent the metadata from the second software application;

sending the metadata from the first software application and the second software application to a central analysis server in an environment separate from the first and second application process environments; and building by the central analysis server an end-to-end description of the transaction from the metadata from the first software application and the second software application.

8. The method of claim 7 wherein the end-to-end description of the transaction includes data flow and control flow of the transaction.

9. The method of claim 7 further comprising registering the first and second analysis agents with the central analysis server.

10. The method of claim 7 wherein the first and second analysis agents handshake with the central analysis server.

11. The method of claim 7 further comprising storing the metadata from the first software application and the second software application.

12. The method of claim 7 further comprising an analysis consumer to view the metadata from the first software application and the second software application and the end-to-end description of the transaction.

13. The method of claim 7 further comprising broadcasting by the central analysis server information about the first analysis agent to the second analysis agent and about the second analysis agent to the first analysis agent.

14. The method of claim 13 further comprising providing by the first analysis agent metadata from the first software application to the second analysis agent and providing by the second analysis agent metadata from the second software application to the first analysis agent.

15. A computer program product for agent-based transaction analysis, the computer program product comprising a non-transitory computer readable storage medium having program instructions embodied therewith, the program instructions executable by a processor to cause the processor to perform a method comprising:

building an instrumented binary code of a software application for a transaction;

configuring an analysis agent for the software application;

starting the software application in an application process environment with the instrumented binary code;

attaching the analysis agent to the instrumented binary code of the software application;

extracting by the analysis agent the metadata from the software application wherein the metadata includes data transmitted as a part of the transaction;

sending the metadata to a central analysis server in an environment separate from the application process environment; and building by the central analysis server an end-to-end description of the transaction from the metadata.

16. The computer program product of claim 15 wherein the end-to-end description of the transaction includes data flow and control flow of the business transaction.

17. The computer program product of claim 15 further comprising registering the analysis agent with the central analysis server.

18. The computer program product of claim 1 wherein the analysis agent handshakes with the central analysis server.

19. The computer program product of claim 15 further comprising storing the metadata.

20. The computer program product of claim 15 further comprising an analysis consumer to view the metadata and the end-to-end description of the transaction.

* * * * *